United States Patent
Zhou et al.

(10) Patent No.: US 10,355,801 B2
(45) Date of Patent: Jul. 16, 2019

(54) UNIFIED MOBILE AND TDM-PON UPLINK MAC SCHEDULING FOR MOBILE FRONT-HAUL

(71) Applicant: Futurewei Technologies, Inc., Plano, TX (US)

(72) Inventors: Siyu Zhou, Brooklyn, NY (US); Xiang Liu, Marlboro, NJ (US); Frank Effenberger, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 5 days.

(21) Appl. No.: 15/685,629

(22) Filed: Aug. 24, 2017

(65) Prior Publication Data
US 2018/0076914 A1    Mar. 15, 2018

Related U.S. Application Data

(60) Provisional application No. 62/395,058, filed on Sep. 15, 2016.

(51) Int. Cl.
*H04J 3/06* (2006.01)
*H04Q 11/00* (2006.01)
(Continued)

(52) U.S. Cl.
CPC .......... *H04J 3/0667* (2013.01); *H04B 10/077* (2013.01); *H04B 10/25753* (2013.01);
(Continued)

(58) Field of Classification Search
CPC ............. H04B 10/25753; H04B 10/077; H04J 3/0682; H04J 3/0652; H04J 14/0272;
(Continued)

(56) References Cited

U.S. PATENT DOCUMENTS 8,705,483 B2 *  4/2014  Liu ................. H04L 5/0023
                                                  370/329
8,942,561 B2 *  1/2015  Boyd ............... H04J 3/0658
                                                  398/154
(Continued)

FOREIGN PATENT DOCUMENTS

| CN | 101895344 A | 11/2010 |
| CN | 201947457 U | 8/2011 |
| CN | 103891394 A | 6/2014 |

OTHER PUBLICATIONS

Kobayashi, et al., "Bandwidth Allocation scheme based on Simple Statistical Traffic Analysis for TDM-PON based Mobile Fronthaul," W3C.7.pdf, Optical Society of America, 2016. 3 pages.
(Continued)

*Primary Examiner* — Man U Phan
(74) *Attorney, Agent, or Firm* — Conley Rose, P.C.

(57) ABSTRACT

Disclosed herein are various embodiments that include a method and a passive optical network (PON) for supporting a mobile network. In various embodiments, a baseband unit (BBU) is configured to measure an optical path delay from each remote radio unit (RRU) of a plurality of RRUs to the BBU during an initialization phase. The BBU synchronizes all the RRUs in the mobile system by adjusting the timing of each path based on the optical path delay between each RRU and the BBU. The BBU determines a mapping rule that maps each resource block assigned to each RRU of the plurality of RRUs to a different PON transport block. The BBU transmits the mapping rule to each RRU of the plurality of RRUs. In certain embodiments, the mapping rule may be recalculated dynamically after the initialization phase.

18 Claims, 19 Drawing Sheets

(51) Int. Cl.
*H04J 14/02* (2006.01)
*H04B 10/077* (2013.01)
*H04B 10/2575* (2013.01)
*H04L 27/26* (2006.01)
*H04L 12/24* (2006.01)
*H04L 12/713* (2013.01)
*H04W 88/08* (2009.01)

(52) U.S. Cl.
CPC .......... *H04J 3/0652* (2013.01); *H04J 3/0682* (2013.01); *H04J 14/0267* (2013.01); *H04J 14/0272* (2013.01); *H04L 27/2655* (2013.01); *H04L 27/2697* (2013.01); *H04L 41/0836* (2013.01); *H04L 41/0843* (2013.01); *H04L 41/0893* (2013.01); *H04Q 11/0067* (2013.01); *H04L 41/5054* (2013.01); *H04L 45/586* (2013.01); *H04W 88/085* (2013.01)

(58) Field of Classification Search
CPC ........ H04J 14/0267; H04J 3/0667; H04J 3/06; H04J 14/02; H04L 27/2655; H04L 27/2697; H04L 41/5054; H04L 45/586; H04W 88/085; H04Q 11/00; H04Q 11/0067
USPC .......................................................... 370/503
See application file for complete search history.

(56) References Cited

U.S. PATENT DOCUMENTS

| | | | | |
|---|---|---|---|---|
| 9,112,758 | B2* | 8/2015 | Niu | H04L 27/2628 |
| 9,125,047 | B2* | 9/2015 | Sundaresan | H04W 16/02 |
| 9,154,221 | B2* | 10/2015 | Hu | H04Q 11/0067 |
| 9,184,842 | B2* | 11/2015 | Dahlfort | H04J 14/0282 |
| 9,602,212 | B2* | 3/2017 | Kuwano | H04L 12/2861 |
| 9,866,327 | B2* | 1/2018 | Shibata | H04B 10/25754 |
| 9,998,310 | B2* | 6/2018 | Barbieri | H04L 25/02 |
| 10,097,391 | B2* | 10/2018 | Fertonani | H04L 25/02 |
| 2012/0051371 | A1 | 3/2012 | Sarashina et al. | |
| 2013/0266323 | A1* | 10/2013 | Tan | H04J 3/0682 398/115 |
| 2014/0219651 | A1* | 8/2014 | Ruffini | H04J 14/02 398/33 |
| 2014/0226736 | A1 | 8/2014 | Niu et al. | |

OTHER PUBLICATIONS

Tashiro, et al, "A Novel DBA Scheme for TDM-PON based Mobile Fronthaul," Tu3F.3.pdf, Optical Society of America, 2014, 3 pages.
Machine Translation and Abstract of Chinese Publication No. CN101895344, Nov. 24, 2010, 16 pages.
Machine Translation and Abstract of Chinese Publication No. CN201947457, Aug. 24, 2011, 12 pages.
Foreign Communication From a Counterpart Application, PCT Application No. PCT/CN2017/099866, English Translation of International Search Report dated Nov. 14, 2017, 7 pages.
Foreign Communication From a Counterpart Application, PCT Application No. PCT/CN2017/099866, English Translation of Written Opinion dated Nov. 14, 2017, 6 pages.

* cited by examiner

| T1 | T2 | T3 | T4 | T5 | T6 | T7 | T8 |
|---|---|---|---|---|---|---|---|
| RB1; RRU1 | RB2; RRU1 | RB3; RRU1 | RB4; RRU1 | RB5; RRU1 | RB6; RRU2 | RB7; RRU2 | RB8; RRU1 |

| T9 | T10 | T11 | T12 | T13 | T14 | T15 | T16 | T17 |
|---|---|---|---|---|---|---|---|---|
| RB8; RRU2 | RB9; RRU2 | RB10; RRU2 | RB11; RRU3 | RB12; RRU3 | RB13; RRU3 | RB14; RRU3 | RB15; RRU3 | RB16; RRU3 |

FIG. 8A

UNIFIED MOBILE AND TDM-PON UPLINK MAC SCHEDULING FOR MOBILE FRONT-HAUL

CROSS-REFERENCE TO RELATED APPLICATIONS

This application claims priority to U.S. Provisional Patent Application No. 62/395,058 filed Sep. 15, 2016 and titled "Method of a Unified Mobile and TDM-PON Uplink MAC Scheduling for Mobile Front-haul," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud radio access network or centralized radio access network (C-RAN) is a centralized, cloud computing-based architecture for radio access networks that supports 2G, 3G, 4G, and future wireless communication standards. As the demand for connectivity has exploded, mobile operators have looked for ways to minimize the footprint and cost of their equipment. This has led to centralization of parts of the radio access network (RAN) (i.e., the equipment that connects to cellular antennas, processes the signal, and sends it to the core network). In particular, the baseband processing unit (BBU), which is the part of the RAN, has been moved to a central location from which multiple remote radio heads (RRH) or remote radio units (RRUs) can be served.

SUMMARY

According to one aspect of the present disclosure, there is provided a method and a passive optical network (PON) for supporting a mobile network. In various embodiments, the PON includes a plurality of RRUs and a BBU in communication with the plurality of RRUs. In various embodiments, the BBU is configured to measure an optical path delay from each RRU of the plurality of RRUs to the BBU during an initialization phase. The BBU synchronizes all the RRUs in the mobile system by adjusting the timing of each path based on the optical path delay between each RRU and the BBU. The BBU determines a mapping rule that maps each resource block assigned to each RRU of the plurality of RRUs to a different PON transport block. The BBU transmits the mapping rule to each RRU of the plurality of RRUs. In various embodiments, the BBU synchronizes all the RRUs in the mobile system by setting the largest optical path delay of an RRU as a base delay, and delaying each RRU by the difference between the base delay and the optical path delay of the RRU such that the leading edge of each transport block transmitted by any of the RRUs reaches the BBU at the same time. In certain embodiments, the mapping rule accounts for the optical path delay differences between each of the RRUs and the BBU.

In certain embodiments, a mobile-medium access control (MAC) uplink scheduling is applied to communications between the BBU and the plurality of RRUs. For instance, in various embodiments, the BBU sets a mobile-MAC uplink schedule to match the time division multiplexing-passive optical network (TDM-PON) uplink MAC schedule. In various embodiments, the BBU receives a multiplexed uplink data stream from the plurality of RRUs.

According to a second aspect of the present disclosure, each RRU is configured to perform fast Fourier transform (FFT) on a signal provided from a mobile device, remove cyclic prefixes from the signal, and perform resource block demapping. In various embodiments, each RRU is further configured to generate a mobile-PON frame having data stored in transport blocks assigned to the RRU and empty blocks in the remainder of the mobile-PON frame based on the mapping rule, and transmit the generated mobile-PON frame in an uplink to the BBU.

According to a third aspect of the present disclosure, the BBU may be placed in dynamic mode where it is configured to recalculate the mapping rule based on a number of expected resource blocks from the plurality of RRUs after the initialization phase to generate an updated mapping rule. The BBU transmits the updated mapping rule to each RRU, wherein each RRU applies the updated mapping rule in generating the mobile-PON frame. In one embodiment, the recalculation of the mapping rule is triggered by receiving a request message from a user equipment (UE) via a RRU to notify the BBU of a large amount of buffer data stored by the UE and request additional transport blocks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 8A-8E illustrate dynamic resource block mapping in accordance with various embodiments of the disclosure;

DETAILED DESCRIPTION

Figure 1:
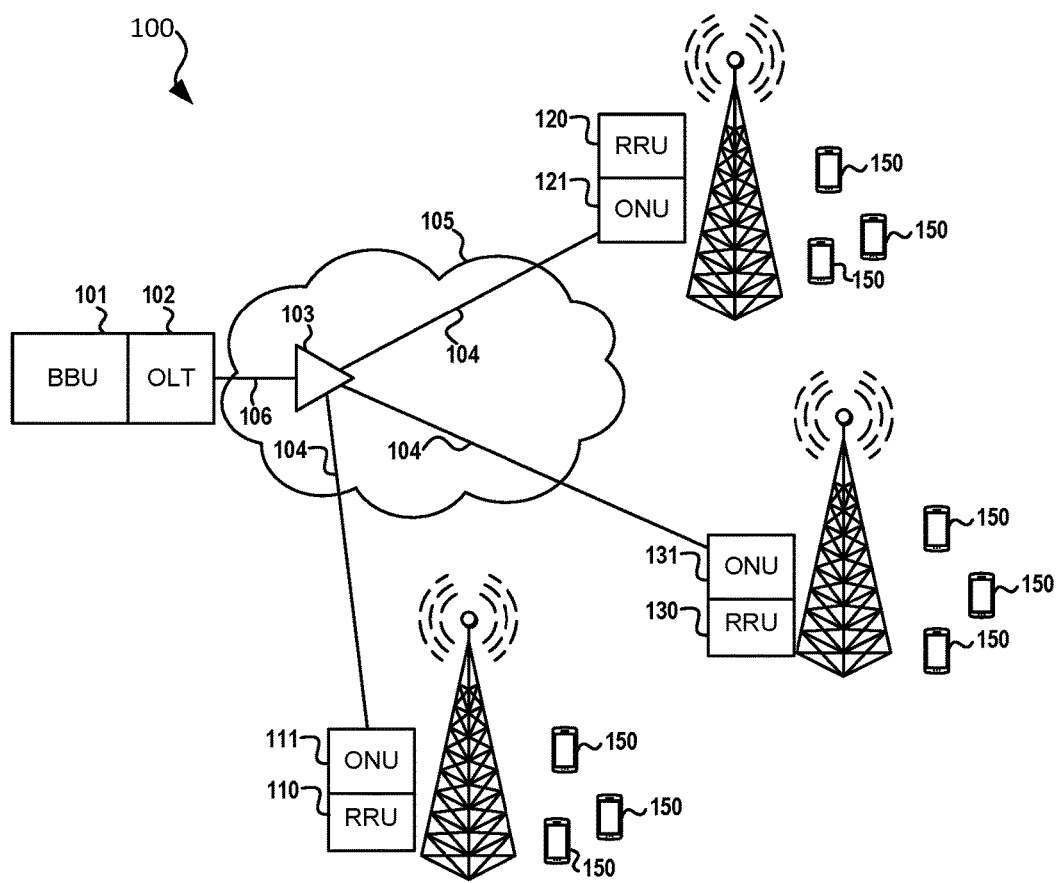
FIG. 1 illustrates a C-RAN in accordance with various embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A module as referenced herein may comprise one or more hardware or electrical components such as electrical circuitry, processors, and memory. The memory may be volatile memory or non-volatile memory that stores data such as, but not limited to, computer executable instructions, machine code, and other various forms of data. The module may be configured to use the data to execute one or more instructions to perform one or more tasks.

There are various mobile-dynamic bandwidth allocation (DBA) schemes that cooperate with mobile scheduling/bandwidth allocation for supplying cost-effective TDM-PON based mobile fronthaul (MFH) with low-latency. One such mobile DBA scheme is "A Novel DBA Scheme for TDM-PON based Mobile Fronthaul" by T. Tashiro et al., OFC 2014, Paper Tu3F.3 ("the Tashiro scheme"). The Tashiro scheme requires signaling and cooperation between a BBU and an optical network unit (ONU). The Tashiro scheme is applied to Common Public Radio Interface (CPRI) with fixed transmission rate, and thus the ONU has the same uplink rate. One drawback of the Tashiro scheme is that it may transmit noise because a RRH always sends data messages even when there is no data from the UE to send.

Another mobile DBA uplink scheme includes "Bandwidth Allocation Scheme based on Simple Statistical Traffic Analysis for TDM-PON based Mobile Fronthaul" by T. Kobayashi, et al., OFC 2016, paper W3C.7 ("the Kobayashi scheme"). This DBA scheme proposes a bandwidth allocation scheme based on simple statistical traffic analysis for realizing cost-effective TDM-PON based MFH, and uses quasi-fixed bandwidth allocation (FBA). The bandwidth allocation is gradually changed over the period of several tens of minutes or over several hours. One drawback of the Kobayashi scheme is that mobile traffic is inherently too random and full of bursts for predictions based on averaged statistical results. Therefore, the Kobayashi scheme requires a long timeline of traffic information to do statistical analysis, and thus cannot respond to fast changes. This scheme also does not consider delay introduced by cycle time in Ethernet passive optical network (E-PON).

As described above, in C-RAN, the BBUs have been moved to a central location from which multiple RRUs can be served. Fiber is typically used to connect BBUs to the RRUs at the cell sites, and this connection is often referred to as "fronthaul." Fronthaul has become a crucial segment in C-RAN enabling new wireless technologies such as coordinated multi-point (CoMP) and massive multiple-input multiple-output (MIMO) etc.

The disclosed embodiments enable a unified mobile and TDM-PON uplink MAC scheduling for mobile fronthaul that seek to improve upon known mobile DBA uplink schemes. In accordance with various embodiments, one scheduling may be used for both a wireless system (such as Long-Term Evolution (LTE)) and an optical system because the ONUs share the same optical interface, and the RRUs share the same air medium. In one embodiment, this process involves mapping or translating the LTE wireless MAC scheduling to a TDM-PON MAC scheduling. For example, in one embodiment, a predefined mapping rule is used to map each LTE resource block to a PON transport block, and thus eliminate the delay for bandwidth allocation. A resource block is the smallest unit of resources that can be allocated to a UE. In various embodiments, the scheduling takes into account the varying optical path delay from each RRU to BBU by synchronizing the RRUs to avoid uplink interference caused by propagation path timing difference.

In addition, the disclosed embodiments provide for an optimal physical layer functional split that lowers the bandwidth requirements on mobile fronthaul. For example, in various embodiments, instead of sending raw digitized radio signal directly over fiber, the RRU performs fast Fourier Transform (FFT), cyclic prefix removal, and resource demapping. Thus, the actual data being sent through fiber will not only be less than that of the CPRI, but will also be load dependent, whereas the data rate under CPRI is fixed, as if the system is always at peak load. Additionally, multiplexing gain may be achieved with multiple RRUs sharing the same mobile-PON bandwidth. Advantages of the disclosed embodiments include lower equipment cost TDM-PON and lower fiber provisioning requirement.

FIG. 1 illustrates a C-RAN 100 in accordance with various embodiments of the disclosure. In the depicted embodiment, the C-RAN 100 comprises a BBU 101, an optical line terminal (OLT) 102, a RRU 110, a RRU 120, and a RRU 130. The C-RAN 100 requires reliable, excessive bandwidth, and low latency fronthaul transmission from RRUs 110, 120, 130 to the BBU 101. The BBU 101 and OLT 102 are located at a central location such as a central office. The BBU 101 acts as a digital unit implementing the base station functionality from baseband processing to packet processing. Baseband refers to the original frequency range of a transmission signal before it is modulated. Although only a single BBU 101 is illustrated, a plurality of BBUs 101 may be located at the central location to form a BBU pool. In some embodiments, the BBUs 101 are linked and can share information, while in others they are simply located in the same location. The OLT 102 is an access node that enables the BBU 101 to communicate over a PON 105.

The RRU 110, RRU 120, and RRU 130 are each located at a base station (such as an evolved node B (eNB) for example) and communicate wirelessly with one or more UE 150s. The UE 150 may be any kind of electronic device such as a mobile phone or mobile computing device. In various embodiments, the RRU 110, RRU 120, and RRU 130 are not located far from one and another, and may operate at the same one or same set of carrier frequencies. The RRUs 110, 120, 130 communicate with the BBU 101 via the PON 105 using ONUS 111, 121, and 131 in this example. For instance, in the depicted embodiment, RRU 110 is communicatively coupled to an ONU 111, RRU 120 is communicatively coupled to an ONU 121, and RRU 130 is communicatively coupled to an ONU 131. ONU 111, ONU 121, and ONU 131 are access nodes that convert an electrical signal to an optical signal (and vice versa) for enabling communication over a fiber optic line 104 of the PON 105. The OLT 102 performs a similar function at the central location for the BBU 101. In certain embodiments, the BBU 101/OLT 102 and the RRUs 110, 120, 130/ONUS 111, 121, 131 may be configured as a single device. Therefore, unless otherwise indicated, as used herein, any reference to the BBU includes both the BBU as a stand-alone device and the BBU in combination with the OLT. Similarly, unless otherwise indicated, as used herein, any reference to a RRU includes both the RRU as a stand-alone device and the RRU in combination with an ONU.

As illustrated in FIG. 1, the RRU 110, RRU 120, and RRU 130 are each connected to a multiplexer/demultiplexer 103 via a fiber optic line 104. The multiplexer/demultiplexer 103 is also connected to the BBU 101 via another optical line 106. The multiplexer/demultiplexer 103 is configured to split or demultiplex a single optical signal into multiple optical signals for sending the optical signal to the RRU 110, RRU 120, and RRU 130. Additionally, the multiplexer/demultiplexer 103 is configured to combine or multiplex multiple optical signals from the RRU 110, RRU 120, and RRU 130 into a single optical signal for sending the combined optical signal to the BBU 101.

Figure 2A:
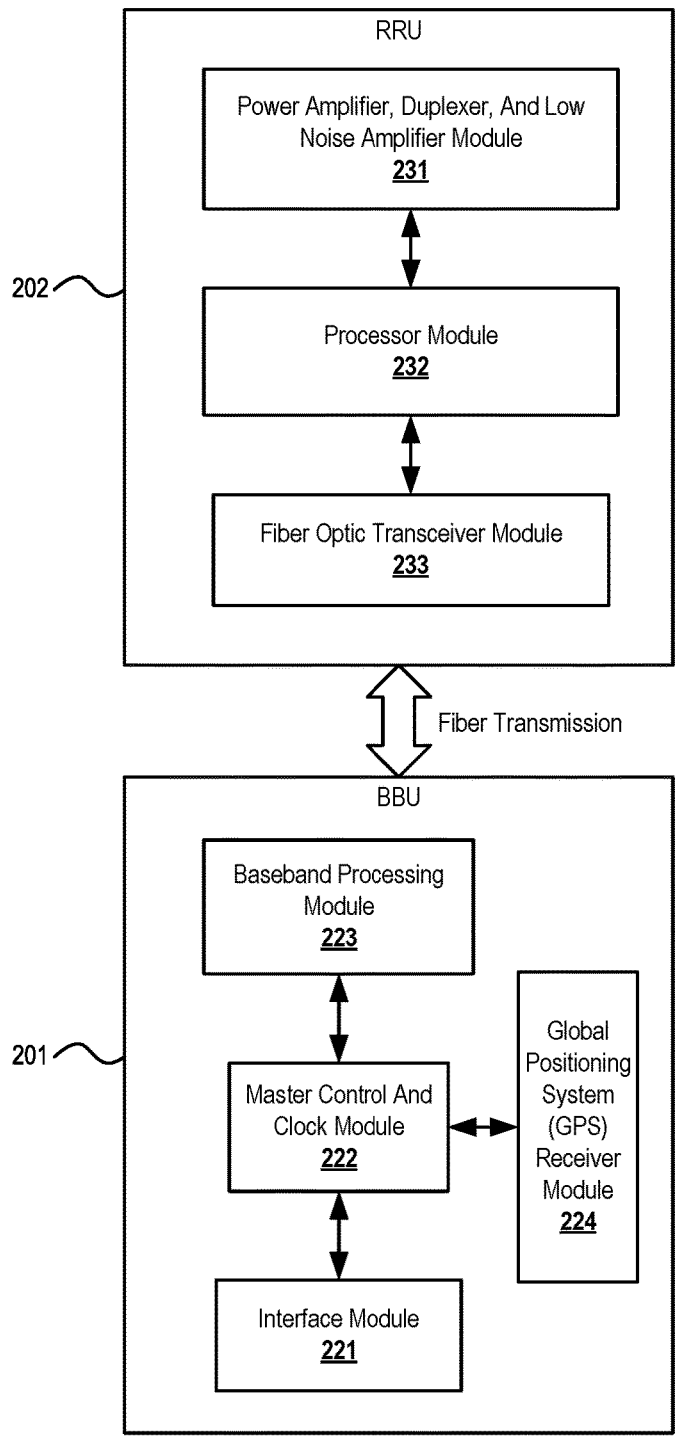
FIG. 2A illustrates an example of a BBU and a RRU architecture in accordance with an embodiment of this disclosure.

Typically, the RRUs perform radio functions, including frequency conversion, amplification, and analog to digital (A/D) and digital to analog (D/A) conversion. For example, FIG. 2A is a block diagram illustrating an example of a BBU 201 and a RRU 202 architecture in accordance with an embodiment of this disclosure. In the depicted embodiment, the RRU 202 comprises a power amplifier, duplexer, and low noise amplifier module 231, a processor module 232, and fiber optic transceiver module 233. The processor module 232 is communicatively coupled to the power amplifier, duplexer, and low noise amplifier module 231 and to the fiber optic transceiver module 233. The power amplifier, duplexer, and low noise amplifier module 231 is configured to send and receive radio-frequency signals via one or more antennas, convert a low-power radio-frequency signal into a higher power signal, and combine two or more power amplifier outputs into one. The processor module 232 is configured to process analog and/or digital signals. The fiber optic transceiver module 233 provides a communications line or link designed to carry multiple signals simultaneously to provide network access between the RRU 202 and the BBU 201 via a fiber optical line.

The BBU 201 comprises an interface module 221, a master control and clock module 222, a baseband processing module 223, and global positioning system (GPS) receiver module 224. The baseband processing module 223 communicates with the RRU 202 and is configured to process the baseband signal as further described below. The master control and clock module 222 receives location coordinates from the GPS receiver module 224 and controls the timing of the signals. The interface module 221 is configured to enable the BBU 201 to communicate with other network devices.

Figure 2B:
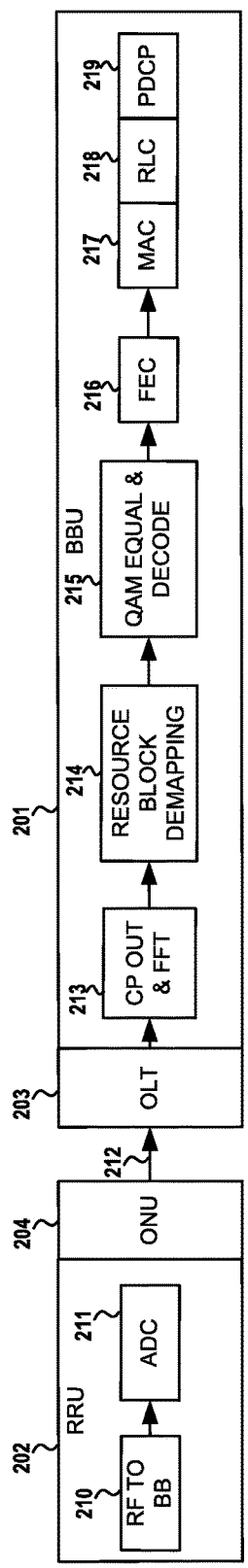
FIGS. 2B-2C illustrate a comparison of traditional physical layer functions and a division of physical layer function in accordance with various embodiments of the disclosure.

FIG. 2B illustrates a functional split in the physical layers between the RRU 202 and the BBU 201 in a traditional system. The RRU 202 receives a radio frequency (RF) signal, such as from a UE 150, and converts it to a baseband signal at block 210. The RRU 202 then converts the analog baseband signal to a digital signal using CPRI encoding at analog to digital converter (ADC) at block 211. The RRU 202 then sends the entire raw data to the BBU 201 via the ONU 204 using digital radio over fiber (DRoF) 212.

The BBU 201 receives the raw signal from the RRU 202 via the OLT 203. The BBU 201 removes the cyclic prefix (CP) and performs FFT at block 213. The term cyclic prefix refers to the prefixing of a symbol with a repetition of the end. The cyclic prefix serves as a guard interval and eliminates intersymbol interference from the previous symbol. As a repetition of the end of the symbol, it allows the linear convolution of a frequency-selective multipath channel to be modelled as circular convolution using FFT.

At block 214, the BBU 201 performs resource block demapping to extract the signal of the UE 150. The BBU 201 at block 215 performs quadrature amplitude modulation (QAM) equalization and processed signal decoding. QAM combines two amplitude-modulated (AM) signals into a single channel, thereby doubling the effective bandwidth. At block 216, the BBU 201 performs forward error correction (FEC) on the decoded signal. FEC is a method of obtaining error control in data transmission in which the source (transmitter) sends redundant data and the destination (receiver) recognizes only the portion of the data that contains no apparent errors. The signal is then passed from the physical layer (e.g., LTE Layer 1) onto the next layer (e.g., LTE Layer 2) which is composed of three sublayers—the MAC layer 217, the Radio Link Control (RLC) layer 218, and the Packet Data Convergence Protocol (PDCP) layer 219.

Figure 2C:
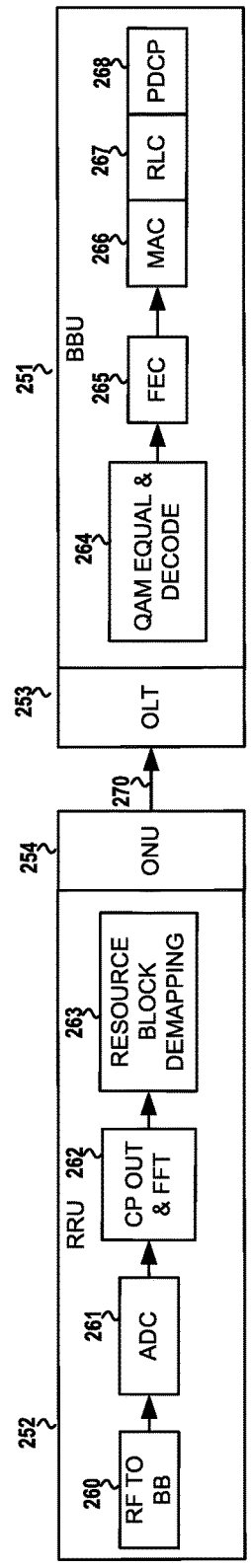

FIG. 2C illustrates a functional split in the physical layers between a RRU 252 and a BBU 251 in accordance with an embodiment of the disclosure. Similar to the RRU 202, the RRU 252 receives a RF signal from a UE 150 and converts it to a baseband signal at block 260. At ADC block 261, the analog baseband signal is converted to a digital signal using CPRI encoding. However, instead of sending raw digitized radio signal directly over fiber as performed by RRU 202, the RRU 252 is configured to send processed data to the BBU 251 by removing the cyclic prefix and performing FFT at block 262, and performing resource block demapping at block 263 before sending the processed signal over the PON to the BBU 251 via ONU 254 using DRoF 270. The BBU 251 receives the processed signal via a OLT 253 and performs QAM equalization and processed signal decoding at block 264. At block 265, the BBU 251 performs FEC on the decoded signal and passes the signal from the physical layer onto the next layer comprising MAC layer 266, RLC layer 267, and PDCP layer 268.

Benefits of the various embodiments include a lower equipment cost for TDM-PON, and lower fiber provisioning requirement. The actual data being sent through fiber will not only be less than that of CPRI because the data rate under CPRI is fixed as if the system is always at peak load. The actual processed data amount can also be load dependent and not send noise, as occurs in CPRI schemes. Further, a multiplexing gain can be achieved with multiple RRUs sharing the same mobile-PON bandwidth.

Figure 3A:
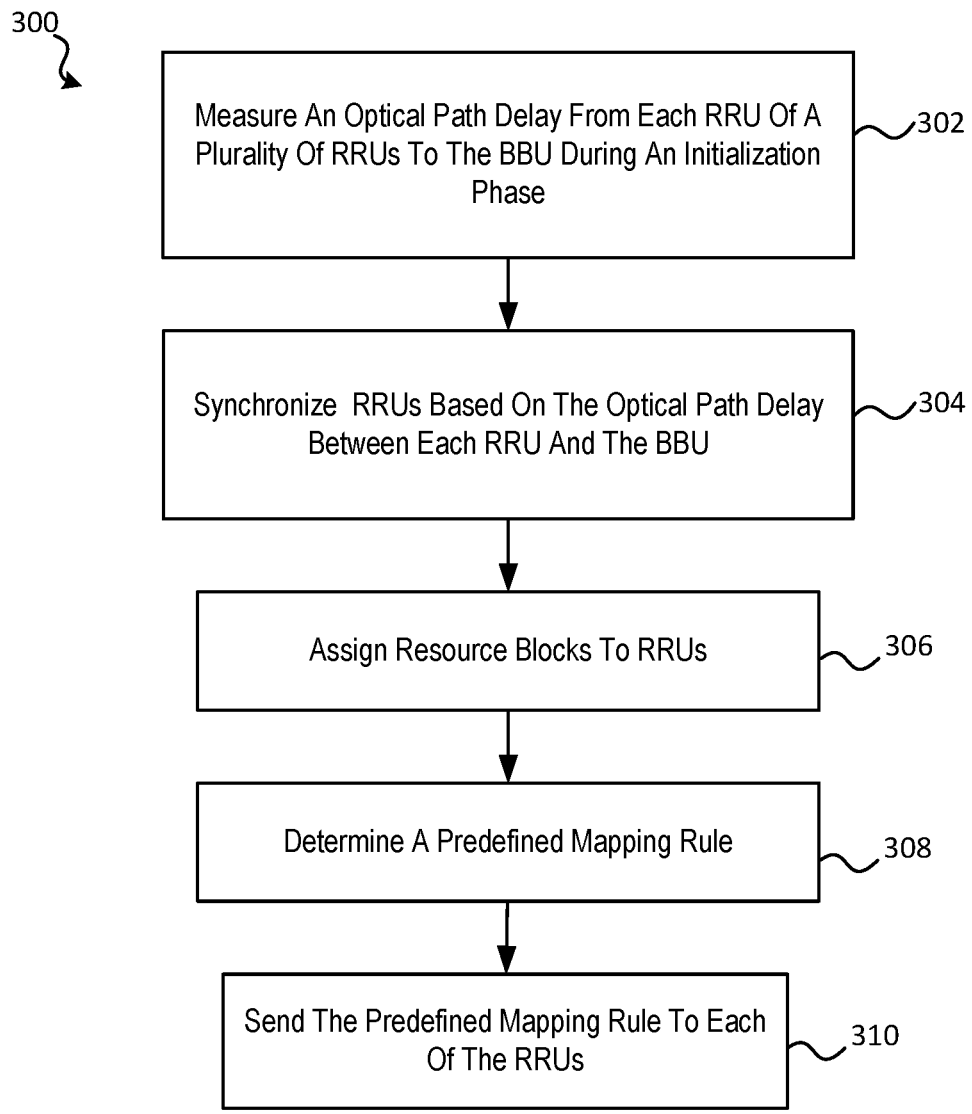
FIG. 3A is a flowchart of an exemplary method for performing PON uplink scheduling performed by a BBU in accordance with an embodiment of the disclosure.

FIG. 3A is a flowchart of an exemplary method 300 for performing PON uplink scheduling performed by a BBU in accordance with an embodiment of the disclosure. The method 300 begins at block 302 with the BBU measuring an optical path delay from each RRU of a plurality of RRUs to the BBU during an initialization phase. At block 304, the BBU synchronizes all the RRUs in the mobile system by adjusting the timing of each path based on the optical path delay between each RRU and the BBU. In one embodiment, synchronizing all the RRUs in the mobile system is performed by setting the largest optical path delay as a base delay and delaying each RRU by the difference between the base delay and the optical path delay of the RRU. In one embodiment, the RRUs are synchronized such that the leading edge of each transport block transmitted by any of the RRUs reaches the BBU at the same time.

At block 306, the BBU assigns each RRU one or more resource blocks of an Orthogonal Frequency-Division Multiple Access (OFDMA) frame. At block 308, the BBU determines a predefined mapping rule that maps each resource block of the OFDMA frame to a PON transport block. At block 310, the BBU sends the predefined mapping rule to each of the RRUs, with the method 300 terminating thereafter.

Figure 3B:
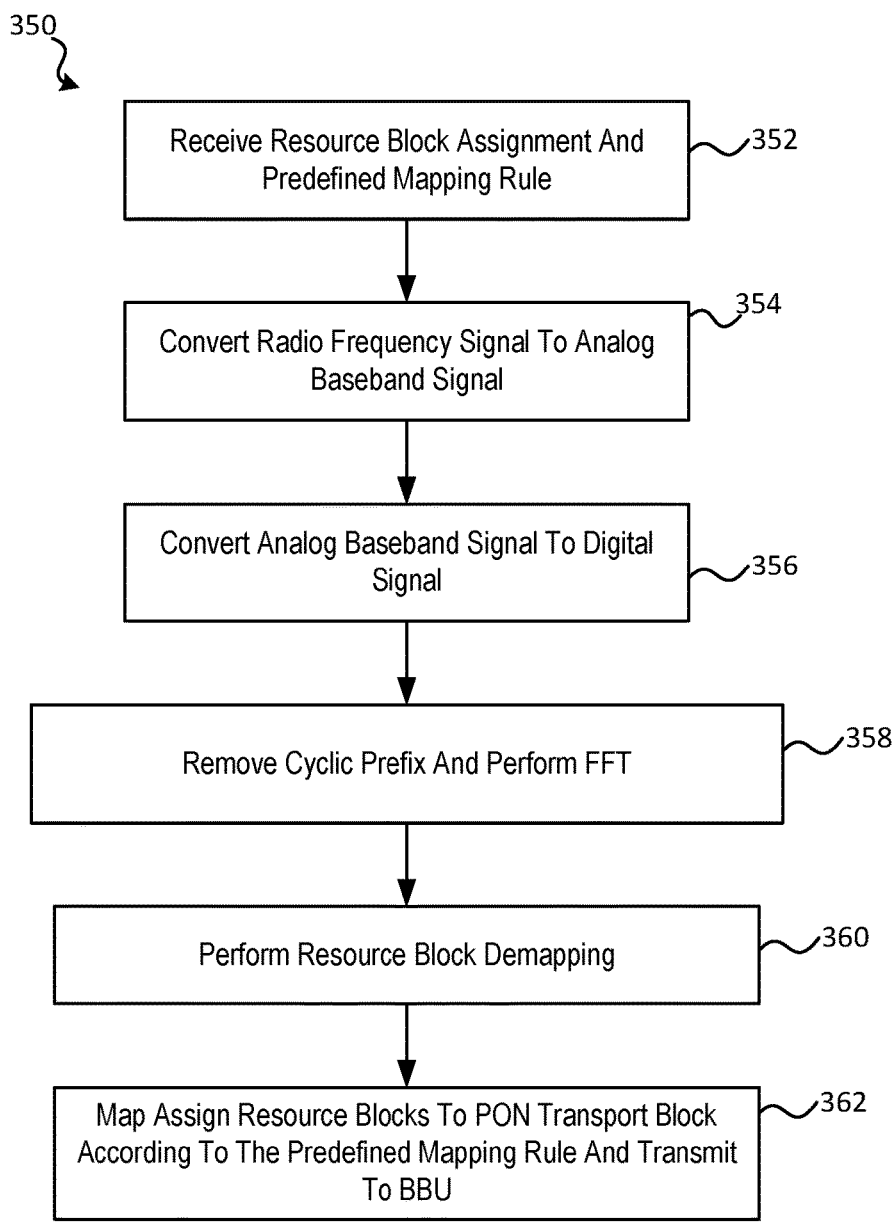
FIG. 3B is a flowchart of an exemplary method for performing PON uplink scheduling by a RRU in accordance with an embodiment of the disclosure.

FIG. 3B is a flowchart of an exemplary method 350 for performing PON uplink scheduling by a RRU in accordance with an embodiment of the disclosure. The method 300 begins at block 352 with the RRU receiving resource block assignment from a BBU and a predefined mapping rule that maps each resource block of an OFDMA frame to a PON transport block. At block 354, the RRU receives a RF signal from a UE and converts it to a baseband signal. At block 356, the RRU converts the analog baseband signal to a digital signal. At block 358, the RRU removes the cyclic prefixes (CPs) from the digital signal and performs FFT on the digital signal.

At block 360, the RRU performs resource block demapping to extract the data. In one embodiment, the RRU is aware of the boundary between each resource block. The RRU samples and quantizes each resource block instead of the entire spectrum. The RRU sends the resource block to the BBU when there is data. The RRU discards the resource block when there is no data, rather than sending a frame without data. In accordance with the various embodiments, the quantization resolution can be lower than CPRI after the physical layer split. For example, 12*7=84 samples per resource block, with 2*8 quantization bits per sample. In certain embodiments, in order to avoid inter-cell interference, adjacent RRUs cannot use the same resource block. Thus, the RRU bandwidth multiplexing gain is significant.

At block 362, the RRU maps its assigned resource blocks to a PON transport block according to the predefined mapping rule. For example, based on its location in an OFDMA frame, each resource block is mapped to a specific mobile PON transport block based on the predefined mapping rule by BBU. In accordance with certain embodiments, the mapping rule takes into account the optical path delay differences between the RRUs and the BBU. In one embodiment, the optical path delays and mapping rule are calculated during initialization of the network. The BBU schedules the wireless interfaces such that UEs in the same area do not interfere with one another.

Figure 4:
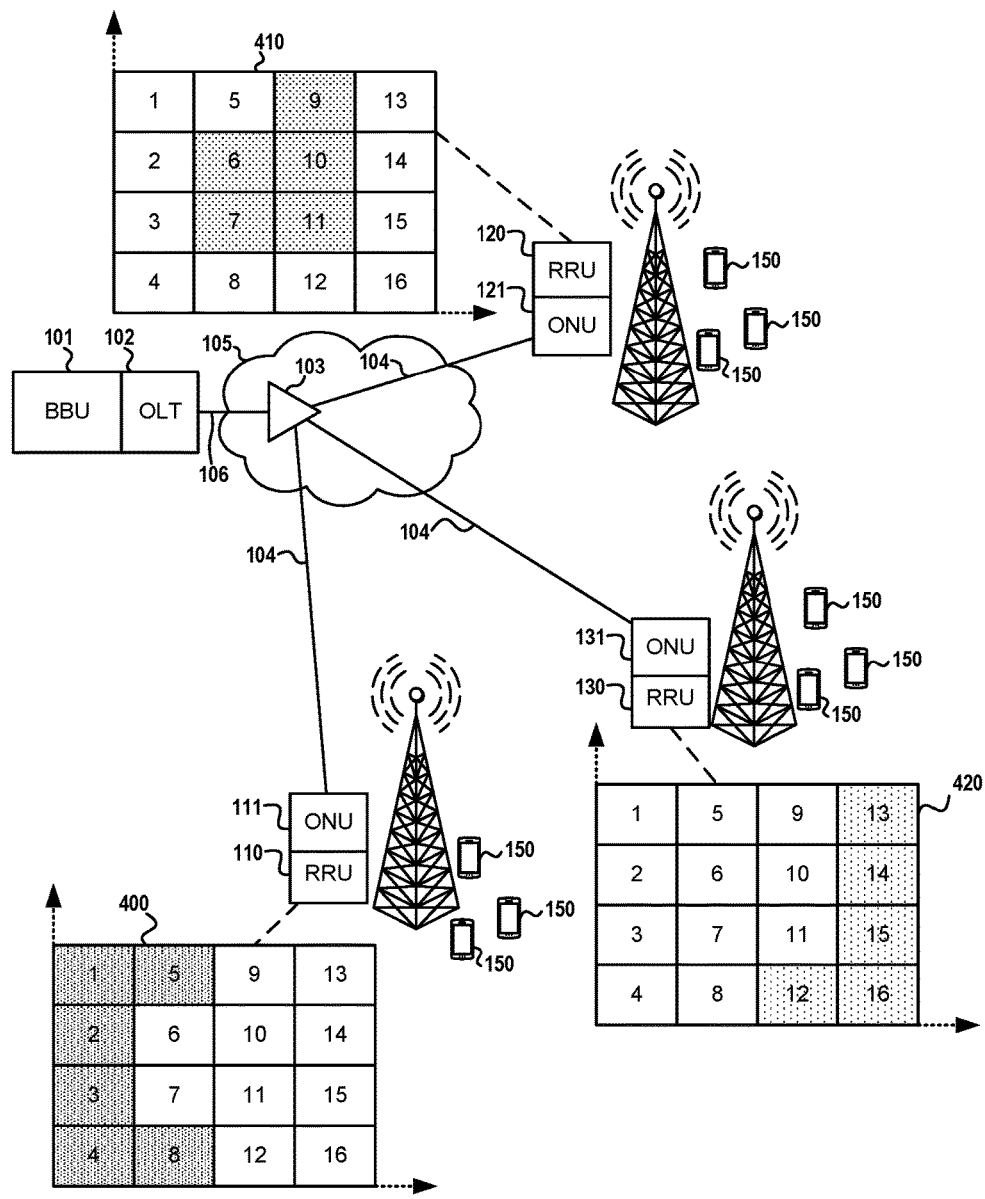
FIG. 4 illustrates a C-RAN implementing resource block mapping in accordance with various embodiments of the disclosure.

FIG. 4 illustrates the C-RAN 100 implementing a resource block assignment in accordance with various embodiments of the disclosure. In the depicted embodiment, the BBU 101 assigns resource blocks 1-5, and 8 of OFDMA frame 400 to RRU 110; resource blocks 6-7 and 9-11 of OFDMA frame 410 to RRU 120; and resource blocks 12-16 of OFDMA frame 420 to RRU 130.

Figure 5:
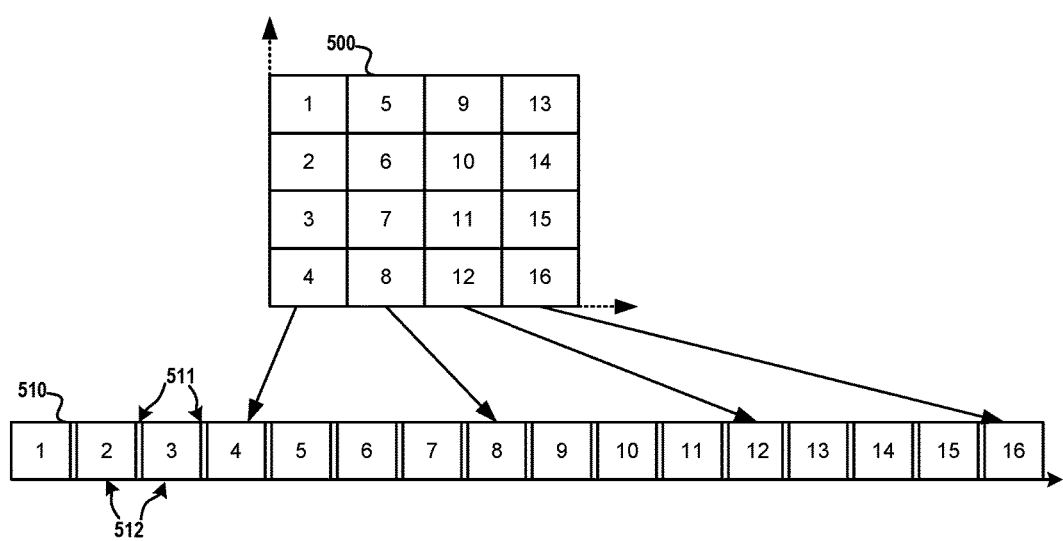
FIG. 5 illustrates static OFDMA frame resource block to mobile-PON frame transport block mapping in accordance with various embodiments of the disclosure.

FIG. 5 illustrates a static mapping of the resource blocks of an OFDMA frame 500 to the transport blocks of a mobile-PON frame 510 in accordance with various embodiments of the disclosure. In one embodiment, in static mapping mode, the required bandwidth provisioning is greater than or equal to the peak load in the entire area rather than the sum of all RRU peak loads. Additionally, the resource block to transport block mapping never changes after the initialization phase.

For purposes of illustration, in FIG. 5, the OFDMA frame 500 comprises resource blocks 1-16, and the mobile-PON frame 510 comprises transport blocks 1-16. However, the OFDMA frame 500 and the mobile-PON frame 510 may include additional resource blocks and transport blocks respectively. In the depicted embodiment, the same resource block number of the OFDMA frame 500 is mapped to the corresponding numbered transport block of the mobile-PON frame 510. However, the resource block may be mapped to the transport block in various different ways in other embodiments.

In various embodiments, the RRUs synchronize their timing with the BBU so that the duration of each mobile-PON frame 510 is the same as each OFDMA frame 500, based on a mobile-MAC uplink scheduling to ensure low latency. In other words, the BBU may be configured to set a mobile-MAC uplink schedule to match the TDM-PON uplink MAC schedule. For example, if the duration of each OFDMA frame 500 is 10 ms, each mobile-PON frame 510 is also synchronized to the same 10 ms. In certain embodiments, the mobile-PON frame 510 includes guard blocks 511 (or guard time) between each of the transport blocks 512. As described above, in accordance with various embodiments of the disclosure, two adjacent transport blocks 512 may be transmitted from different RRUs. The guard blocks 511 ensure that the packets from different subscribers fit into the correct slot to ensure proper reception at the BBU. In various embodiments, a guard block 511 of 40 bits may be sufficient to compensate for small timing errors to ensure that two adjacent transport block signals do not overlap with each other when the transport blocks arrive at the BBU. In various embodiments, the guard block 511 may have more or less than 40 bits, as long as the guard block or guard block(s) provide sufficient compensation for possible timing errors.

Figure 6A:
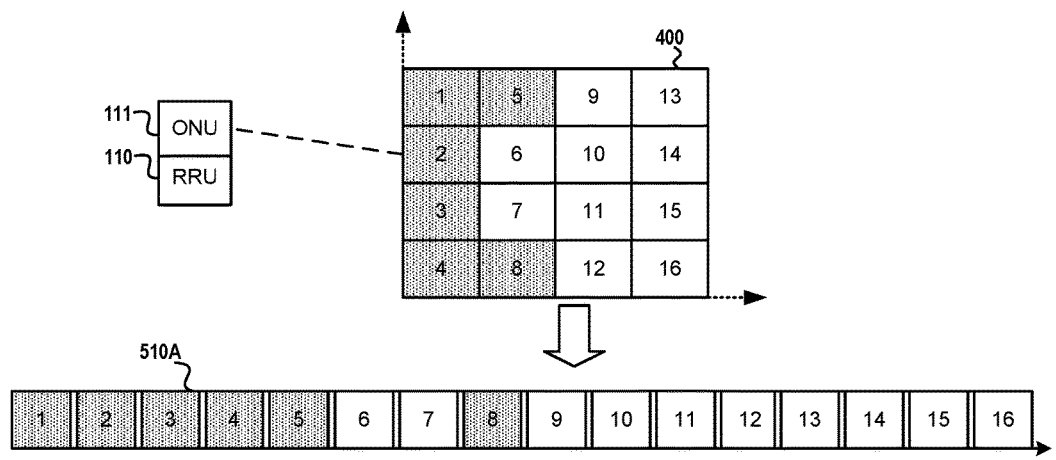
FIGS. 6A-6D illustrate static resource block mapping of multiple units in accordance with various embodiments of the disclosure.
Figure 6B:
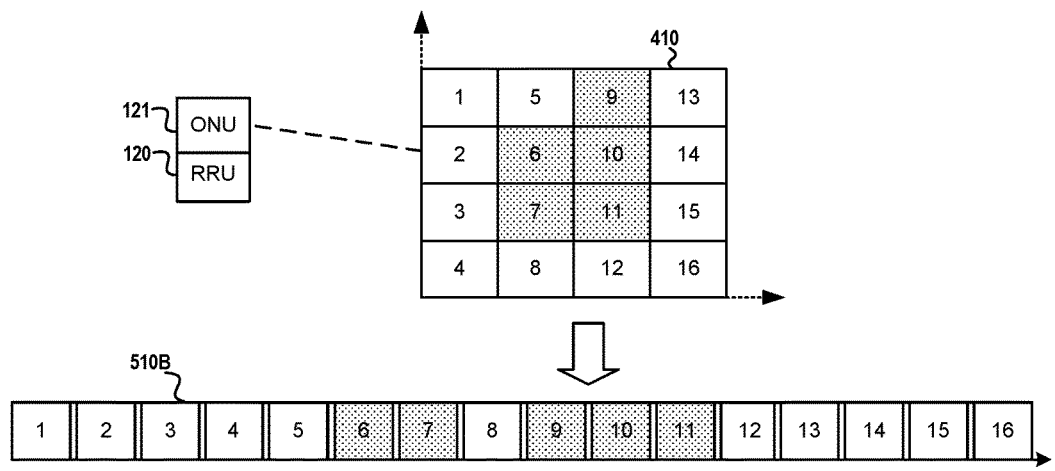
Figure 6C:
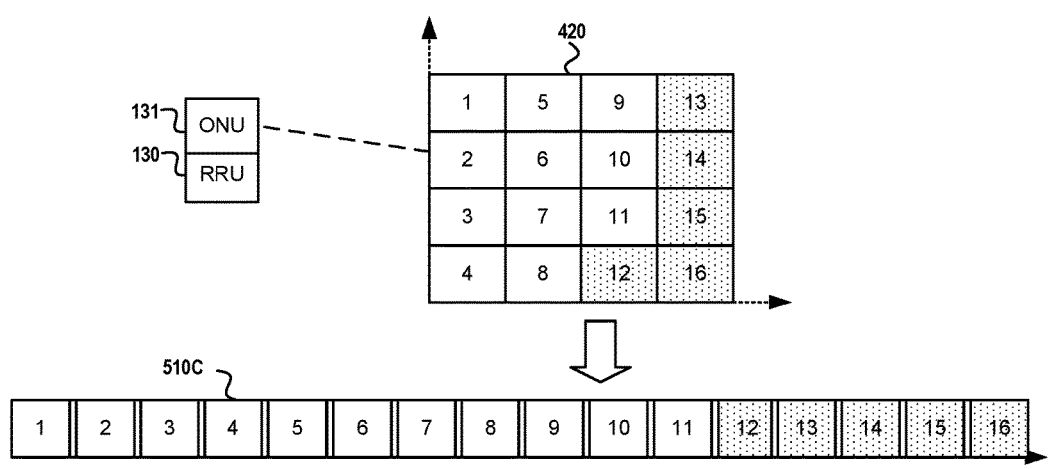

FIGS. 6A-6D illustrate static resource block mapping of each of the RRUs to the transport blocks of the mobile-PON frame 510 in accordance with various embodiments of the disclosure. As illustrated in FIG. 6A, RRU 110 maps resource blocks 1-5 and 8 of OFDMA frame 400 to transport blocks 1-5 and 8 of mobile-PON frame 510A. In FIG. 6B, RRU 120 maps resource blocks 6-7 and 9-11 of OFDMA frame 410 to transport blocks 6-7 and 9-11 of mobile-PON frame 510B. In FIG. 6C, RRU 130 maps resource blocks 12-16 of OFDMA frame 420 to transport blocks 12-16 of mobile-PON frame 510C. In one embodiment, RRU 110, RRU 120, and RRU 130 each send their full mobile-PON frame (510A, 510B, 510C), which may be 16 transport blocks per the example. In one embodiment, RRU 110, RRU 120, and RRU 130 send processed data in the assigned resource blocks only, and send empty blocks in the non-assigned resource blocks. In this way, each RRU sends a frame synchronized with the other RRUs, and the data in the resource blocks do not overlap.

Figure 6D:
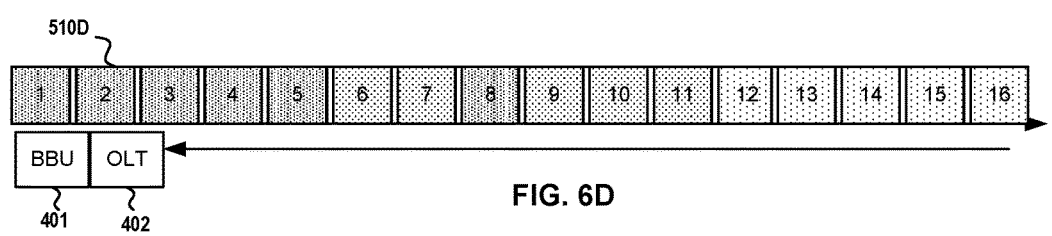

FIG. 6D illustrates a multiplexed signal comprising a mobile-PON frame 510D that combines the signals from RRU 110, RRU 120, and RRU 130. As shown in FIG. 6D, mobile-PON frame 510D includes the combined scheduling of the RRU 110, RRU 120, and RRU 130 with the various assigned resource blocks spaced in the scheduling without any overlap or conflict. In one embodiment, the BBU 401 is able to generate the multiplexed signal comprising the mobile-PON frame 510D from the RRUs because the independent frames mesh without overlapping each RRU's data. In another embodiment, the BBU 401 receives via the OLT 402 the multiplexed signal comprising the mobile-PON frame 510D. For example, in some embodiments, the multiplexed signal comprising the mobile-PON frame 510D may be generated prior to the BBU 401 by another network device such as, but not limited to, the multiplexer/demultiplexer 103 and/or at the OLT 402 depicted in FIGS. 1 and 4.

Figure 7A:
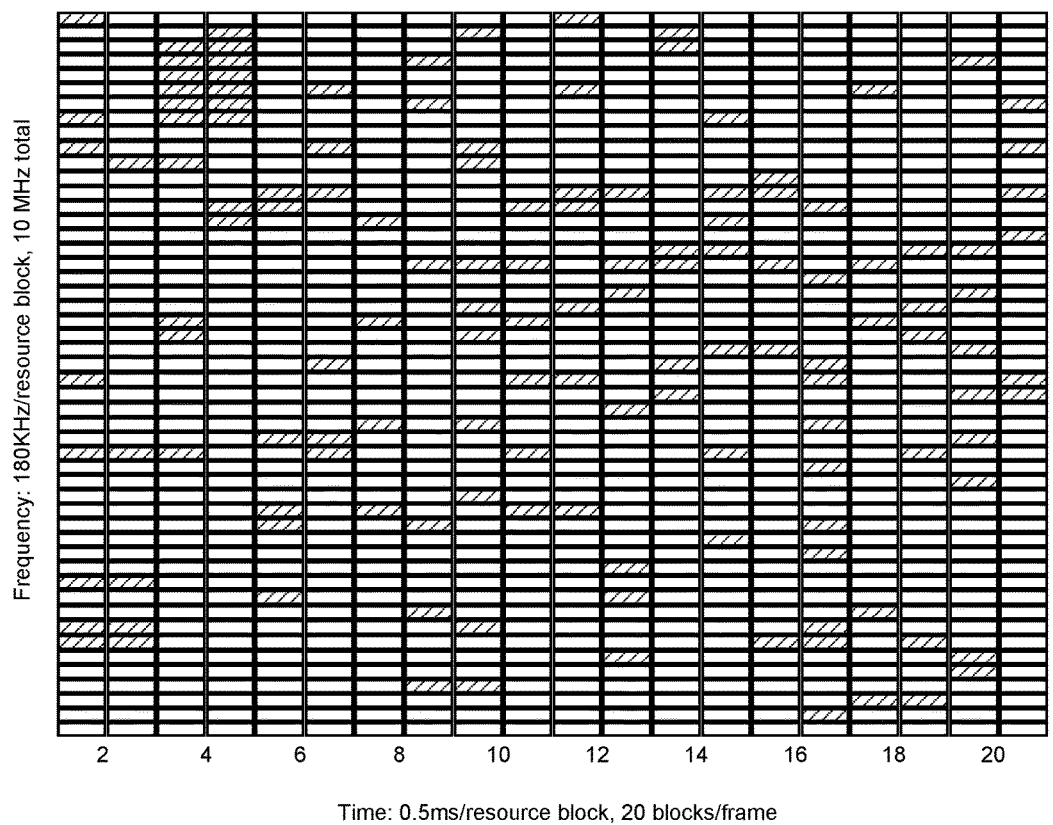
FIGS. 7A-7E illustrate static resource block mapping in accordance with various embodiments of the disclosure.
Figure 7B:
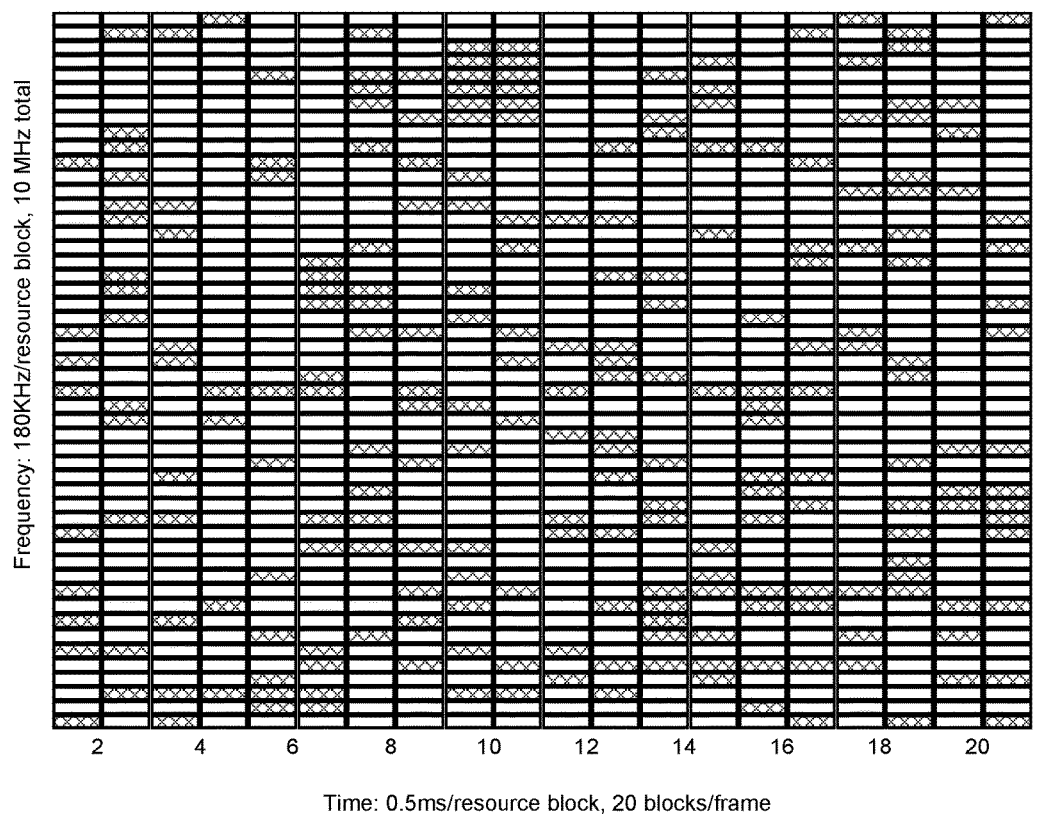
Figure 7C:
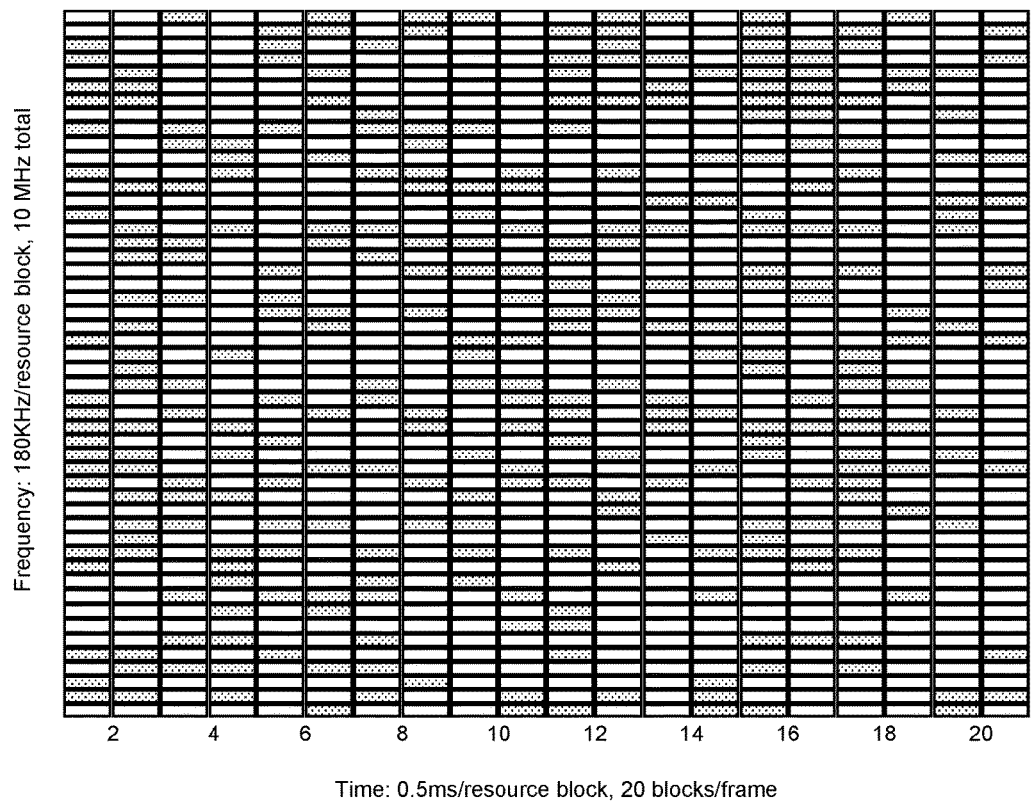
Figure 7D:
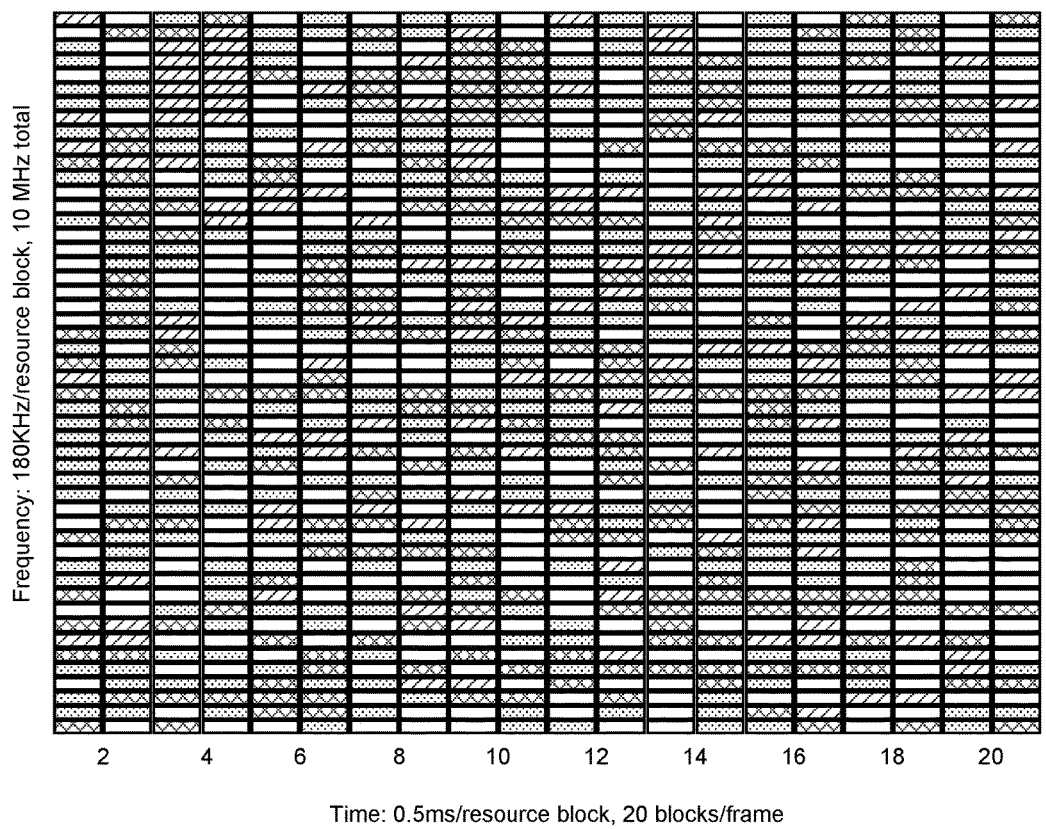
Figure 7E:
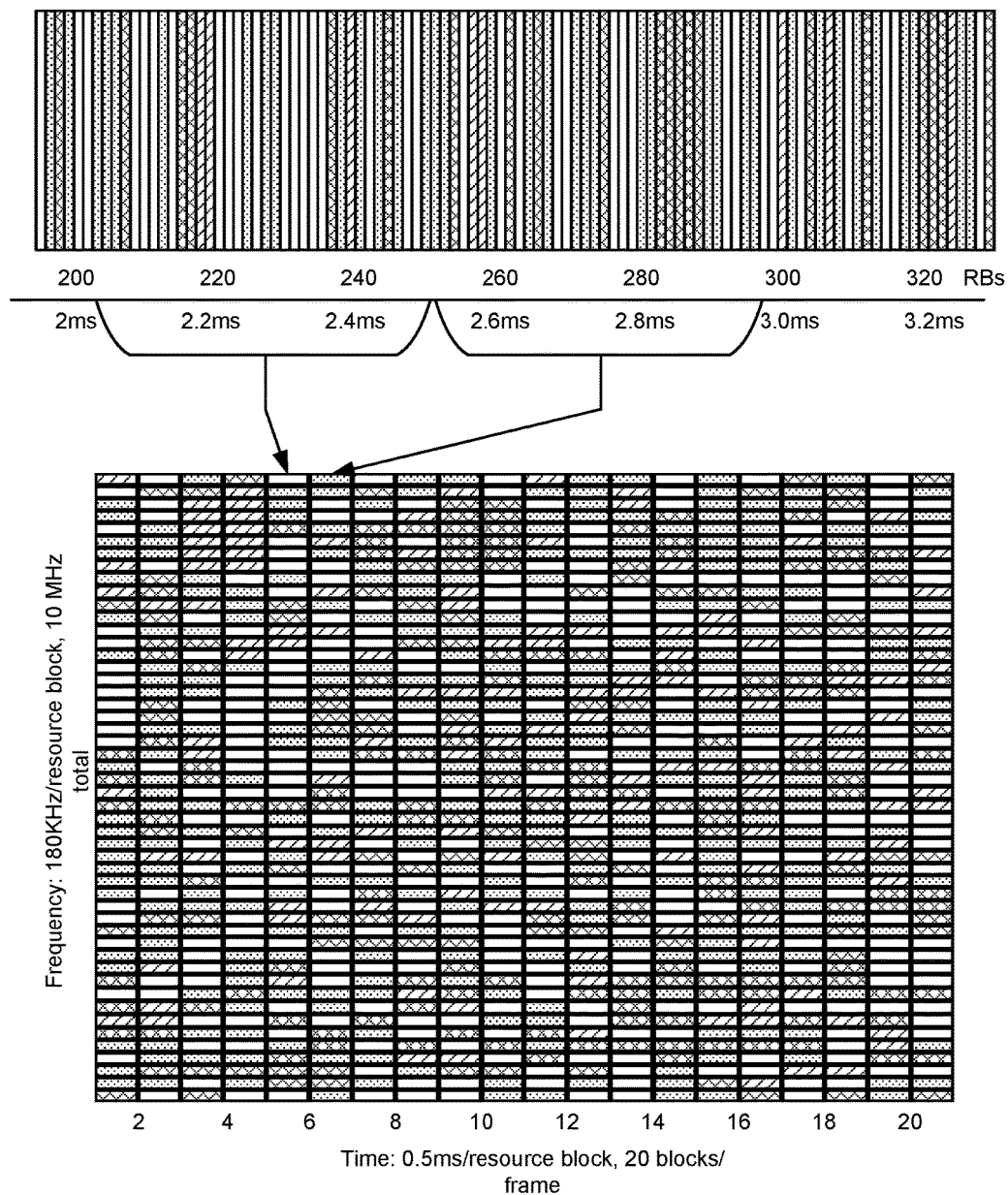

FIGS. 7A-7D illustrate examples of the assigned resource blocks in a two dimensional time (0.5 ms/resource block, 20 blocks/frame) and frequency (180 KHz/resource block, 10 MHz total) representation in accordance with an embodiment of the disclosure. FIG. 7A illustrates the assigned resource blocks for RRU 110. FIG. 7B illustrates the assigned resource blocks for RRU 120. FIG. 7C illustrates the assigned resource blocks for RRU 130. FIG. 7D illustrates the combined assigned resource blocks for RRU 110, RRU 120, and RRU 130. FIG. 7E illustrates a sample snapshot of a static rule mapping from a two dimensional, time and frequency multiple access scheme, to an only time divided multiplexing scheme for Mobile-PON. As depicted in FIG. 7E, the 20×50 LTE resource blocks are mapped to 1000 PON transport blocks. As referenced above, the BBU 101 assigns resource blocks to RRU 110, RRU 120, and RRU 130 that do not overlap to prevent conflicts in static mode where mapping of the resource blocks to the PON transport block does not change after the initialization phase.

In alternative embodiments, the disclosed embodiments may be configured to provide dynamic resource block mapping, where the BBU is configured to recalculate the mapping of the resource blocks to the PON transport blocks after an initialization phase, and update the mapping rule accordingly. In various embodiments, the recalculation and updating occurs whenever the wireless scheduling changes, which can be as often as every 1 ms, or upon every sub frame duration. The RRUs are provided with the updated mapping rule in order to not have interference between RRUs during the uplink. In various embodiments, the dynamic mapping may increase the multiplexing bandwidth gain.

In various embodiments, a UE 150 sends a request message to the BBU 101, via one of the RRU 110, RRU 120, and RRU 130, informing the BBU 101 of an amount of data buffered for transmission. The BBU 101 receives the information from each RRU (and thus each UE 150 seeking to send uplink data), and allocates resource transport blocks for each UE 150. The BBU 101 then updates the RRU 110, RRU 120, and RRU 130 and UE 150 with the updated resource mapping. The RRU 110, RRU 120, and RRU 130 proceeds to transmit uplink data using the updated resource mapping.

Figure 8B:
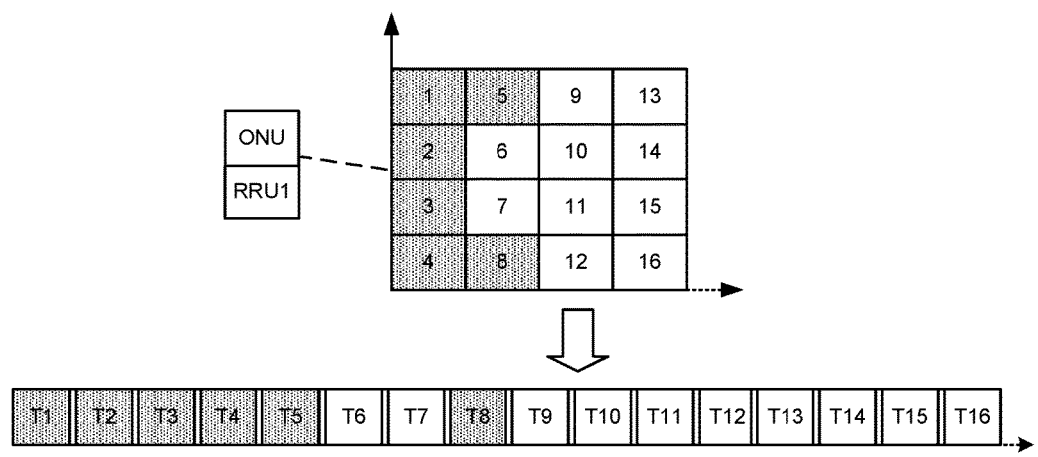
Figure 8C:
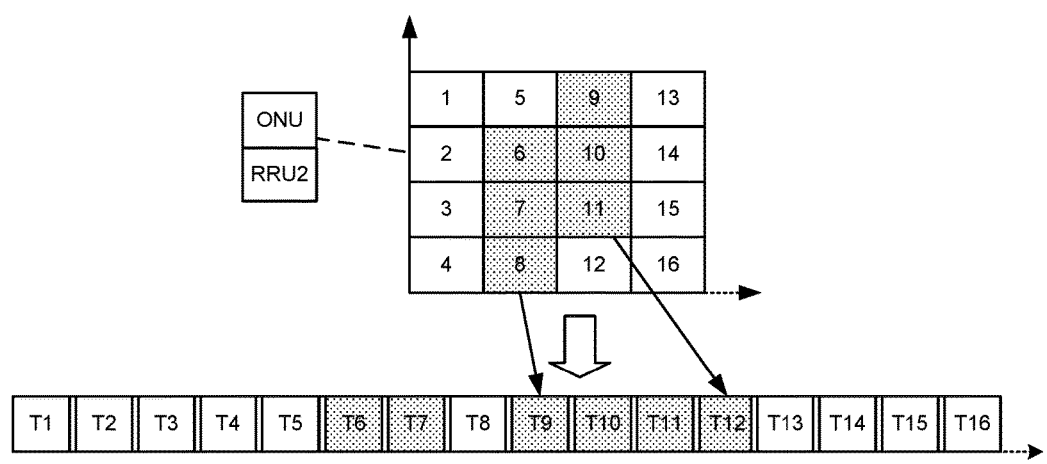
Figure 8D:
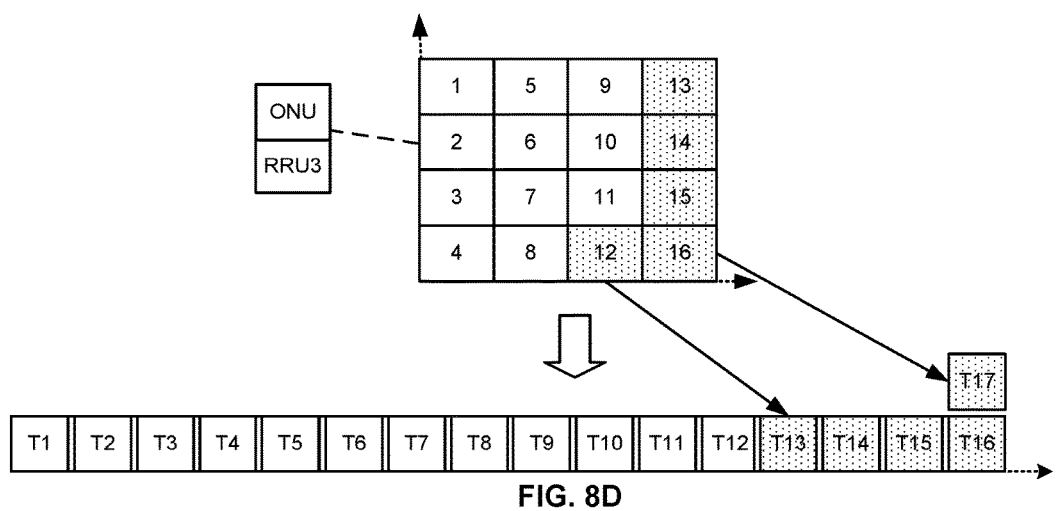
Figure 8E:
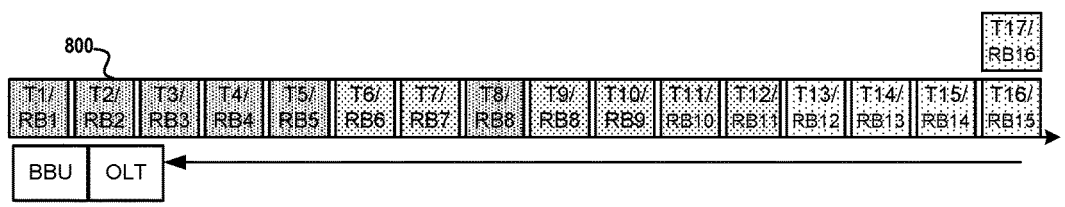

In various embodiments, in the dynamic mapping mode, RRU 110, RRU 120, and RRU 130 may be assigned the same resource block for transmitting data. The updated mapping avoids any interference by mapping the resource blocks to separate transport blocks. For example, FIGS. 8A-8E illustrate an example of a dynamic mapping rule in which the same resource block is allocated to two RRUs, and then mapped to different transport blocks for transmission. Specifically, FIG. 8A illustrates a mapping rule where resource block 8 (RB8) is assigned to both RRU1 and RRU2. For instance, in the depicted embodiment, transport blocks T1-T5 and T8 are mapped to corresponding resource blocks RB1-RB5 and RB8 of RRU1 as illustrated in FIG. 8B. Transport blocks T6 and T7 are mapped to corresponding resource blocks RB6 and RB7 of RRU2 as illustrated in FIG. 8C. However, because transport block T8 was mapped to RB8 of RRU1, resource blocks RB8-RB10 of RRU2 are mapped to transport blocks T9-T11 respectively. Resource blocks RB11-RB16 of RRU3 are mapped to transport blocks T12-T17 respectively as illustrated in FIG. 8D. FIG. 8E illustrates a multiplexed signal 800 that combines the signals from RRU 110, RRU 120, and RRU 130. The multiplexed signal 800 is sent to the BBU. Thus, in dynamic mode, two or more RRUs may be assigned the same resource block for transmitting data. The dynamic/revised mapping to different transport blocks avoids any interference between the data of the RRUs.

Figure 9:
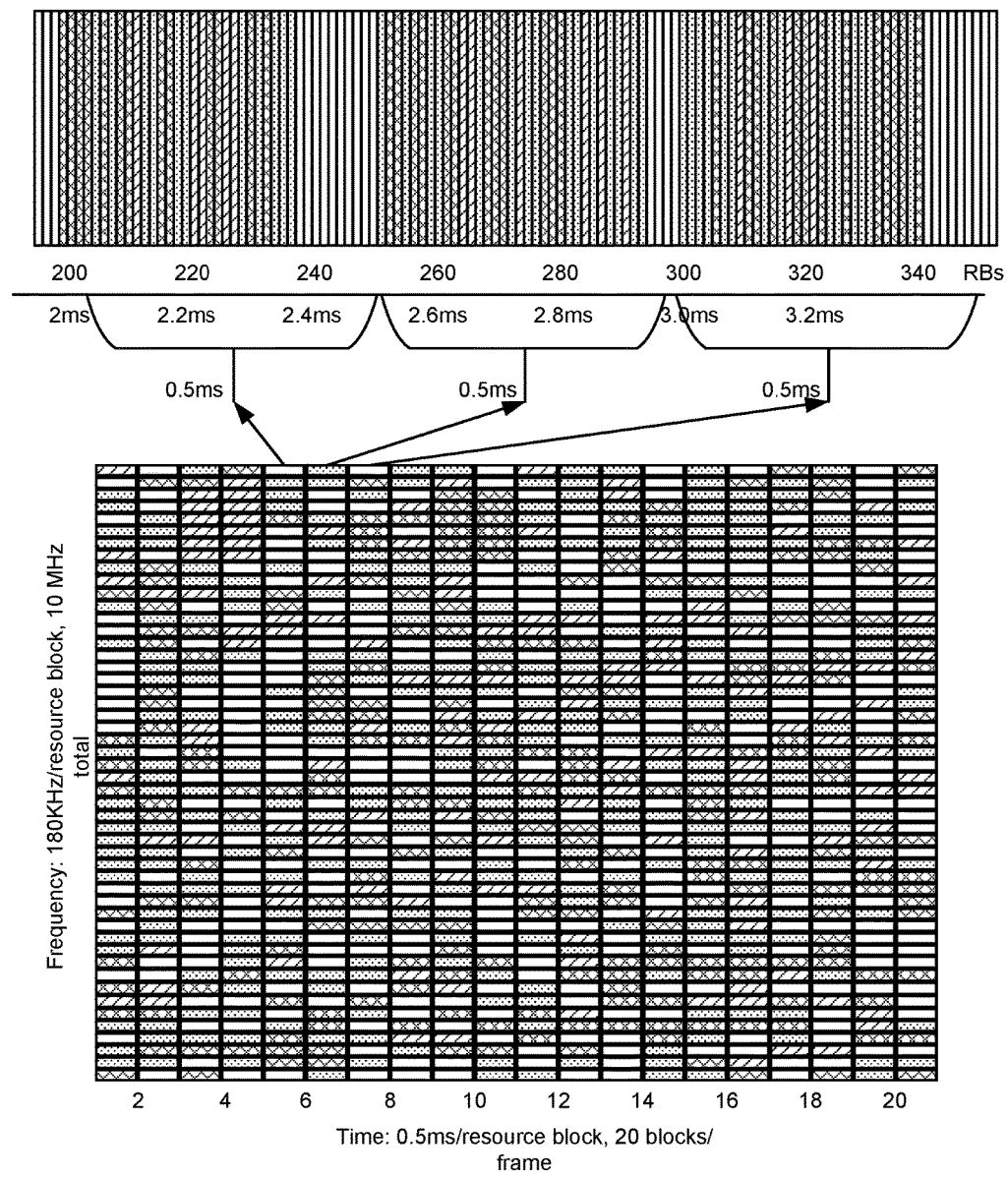
FIG. 9 illustrates dynamic resource block mapping with optimized latency in accordance with various embodiments of the disclosure.

FIG. 9 illustrates an example of the BBU providing a dynamic mapping that assigns the resource blocks to grouped earlier transport blocks within the uplink. As can be appreciated by one skilled in the art, grouping the transport blocks containing data can provide interval periods of no data being transmitted. These down periods may be used for alternative transmissions as desired. Various advantages of the dynamic mapping mode include mapping the various resource blocks to optimize the latency of the transport blocks. The dynamic mapping can occur when the provisioned optical bandwidth is less than the peak wireless data rate, or when two RRUs use the same resource block. In the dynamic mapping, the BBU can be configured to recalculate the mapping rules for each frame when there are changes, and subsequently update the RRUs of the recalculated mapping rules.

Figure 10:
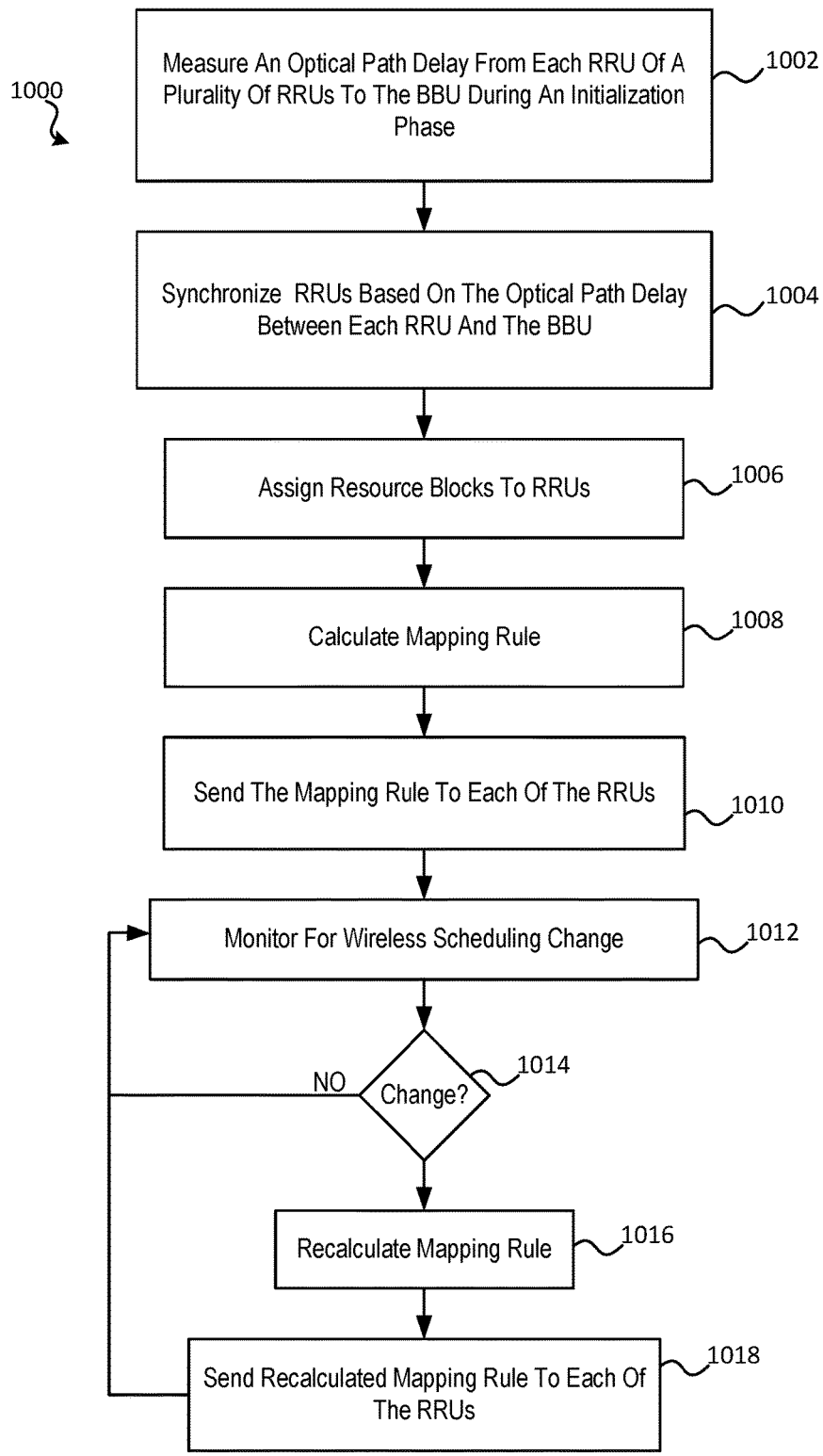
FIG. 10 is a flowchart of an exemplary method for performing PON uplink scheduling performed by a BBU in dynamic mode in accordance with an embodiment of the disclosure.

FIG. 10 is a flowchart of an exemplary method 1000 for performing PON uplink scheduling performed by a BBU in dynamic mode in accordance with an embodiment of the disclosure. The method 1000 begins at block 1002 with the BBU measuring an optical path delay from each RRU of a plurality of RRUs to the BBU during an initialization phase. At block 1004, the BBU synchronizes all the RRUs in the mobile system by adjusting the timing of each path based on the optical path delay between each RRU and the BBU. At block 1006, the BBU assigns each RRU one or more resource blocks of an OFDMA frame. At block 1008, the BBU calculates a mapping rule that maps each resource block of the OFDMA frame to a PON transport block. At block 1010, the BBU sends the mapping rule to each of the RRUs. At block 1012, the BBU monitors for a change in the wireless scheduling. At block 1014, the BBU determines if a wireless scheduling change occurs. If the BBU determines that there is no change in the wireless scheduling, the BBU returns to block 1012 and continues to monitor for changes in the wireless schedule. If the BBU determines that there is a change in the wireless scheduling, the BBU at block 1016 recalculates the mapping rule based on the change in the wireless schedule. The BBU at block 1018 sends the recalculated mapping rule to the RRUs, and returns to block 1012 to continue monitoring for changes in the wireless schedule.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Accordingly, the disclosed embodiments provide a unified mobile and TDM-PON uplink MAC scheduling for mobile fronthaul. Advantages of the disclosed embodiments include lower equipment cost TDM-PON and lower fiber provisioning requirement. For example, the disclosed embodiments may decrease required uplink bandwidth on mobile fronthaul by approximately 10×, eliminate bandwidth scheduling delay in TDM-PON, and enable highly cost-effective TDM point to multi-point mobile fronthaul.

Further, the disclosed embodiments provide for optimal physical layer functional split, which reduces DRoF bandwidth requirement. As described above, instead of sending raw digitized radio signal directly over fiber, the RRU performs FFT, cyclic prefix removal, and resource demapping. The actual data being sent through fiber will not only be less than that of CPRI but also load dependent. Accordingly, multiplexing gain can be achieved with multiple RRUs sharing the same Mobile-PON bandwidth.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A passive optical network (PON) for supporting a mobile network, comprising:
   a plurality of remote radio units (RRUs),
   a baseband unit (BBU) in communication with the plurality of RRUs, the BBU configured to:
      measure an optical path delay from each RRU of the plurality of RRUs to the BBU during an initialization phase;
      synchronize all the RRUs in the plurality of RRUs by adjusting a timing of each path based on the optical path delay between each RRU and the BBU, with the adjusting comprising:
         setting a largest optical path delay as a base delay; and
         delaying each RRU by the difference between the base delay and the optical path delay of the RRU, synchronizing the plurality of RRUs such that a leading edge of each PON transport block transmitted by each of the RRUs reaches the BBU at the same time;
      determine a mapping rule that maps each resource block assigned to each RRU of the plurality of RRUs to a different PON transport block; and
      transmit the mapping rule to each RRU of the plurality of RRUs.

2. The PON of claim 1, wherein a mobile-medium access control (MAC) uplink scheduling is applied to communications between the BBU and the plurality of RRUs.

3. The PON of claim 1, wherein the BBU sets a mobile-MAC uplink schedule to match a time division multiplexing-passive optical network (TDM-PON) uplink MAC schedule.

4. The PON of claim 1, wherein the BBU receives a multiplexed uplink data stream from the plurality of RRUs.

5. The PON of claim 1, wherein the mapping rule accounts for a difference in each optical path delay between each corresponding RRU and the BBU.

6. The PON of claim 1, wherein each RRU is configured to:
   perform fast Fourier transform (FFT) on a signal provided from a mobile device;
   remove cyclic prefixes from the signal; and
   perform resource block demapping.

7. The PON of claim 6, wherein each RRU is further configured to:
   generate a mobile-PON frame having data stored in transport blocks assigned to the RRU and empty blocks in a remainder of the mobile-PON frame based on the mapping rule; and
   transmit the generated mobile-PON frame in an uplink to the BBU.

8. The PON of claim 7, wherein the BBU is further configured to:
   recalculate the mapping rule based on a number of expected resource blocks from the plurality of RRUs after the initialization phase to generate an updated mapping rule; and
   transmit the updated mapping rule to each RRU, wherein each RRU applies the updated mapping rule in generating the mobile-PON frame.

9. The PON of claim 8, further comprising user equipment (UE) configured to send a request message to the BBU via the RRU to notify of a large amount of buffer data and request additional transport blocks, wherein the request message triggers a recalculation of the mapping rule by the BBU.

10. A method of mobile scheduling in a passive optical network (PON), the method comprising:
    measuring, by a baseband unit (BBU), an optical path delay from each remote radio unit (RRU) of the plurality of RRUs to the BBU during an initialization phase;
    synchronizing, by the BBU, all the RRUs in the plurality of RRUs by adjusting a timing of each path based on the optical path delay between each RRU and the BBU, with the adjusting comprising:
       setting a largest optical path delay as a base delay; and
       delaying each RRU by the difference between the base delay and the optical path delay of the RRU, synchronizing the plurality of RRUs such that a leading edge of each PON transport block transmitted by each of the RRUs reaches the BBU at the same time;
    determining, by the BBU, a mapping rule that maps each resource block assigned to each RRU of the plurality of RRUs to a different PON transport block; and
    transmitting, by the BBU, the mapping rule to each RRU of the plurality of RRUs.

11. The method of claim 10, wherein a mobile-medium access control (MAC) uplink scheduling is applied to communications between the BBU and the plurality of RRUs.

12. The method of claim 10, wherein the BBU sets a mobile-MAC uplink schedule to match a time division multiplexing-passive optical network (TDM-PON) uplink MAC schedule.

13. The method of claim 10, wherein the BBU receives a multiplexed uplink data stream from the plurality of RRUs.

14. The method of claim 10, wherein the mapping rule accounts for a difference in each optical path delay between each corresponding RRU and the BBU.

15. The method of claim 10, further comprising:

recalculating, by the BBU, the mapping rule based on a number of expected resource blocks from the plurality of RRUs after the initialization phase to generate an updated mapping rule; and transmitting, by the BBU, the updated mapping rule to each RRU.

16. The method of claim 15, further comprising receiving a request message, by the BBU, from a user equipment (UE) via a RRU of the plurality of RRUs to notify the BBU of a large amount of buffer data stored by the UE and to request additional transport blocks, wherein the request message triggers a recalculation of the mapping rule by the BBU.

17. A method of mobile scheduling in a passive optical network (PON), the method comprising:

measuring, by a baseband unit (BBU), an optical path delay from each remote radio unit (RRU) of the plurality of RRUs to the BBU during an initialization phase;

synchronizing, by the BBU, all the RRUs in the plurality of RRUs by adjusting a timing of each path based on the optical path delay between each RRU and the BBU;

determining, by the BBU, a mapping rule that maps each resource block assigned to each RRU of the plurality of RRUs to a different PON transport block;

transmitting, by the BBU, the mapping rule to each RRU of the plurality of RRUs;

recalculating, by the BBU, the mapping rule based on a number of expected resource blocks from the plurality of RRUs after the initialization phase to generate an updated mapping rule; and transmitting, by the BBU, the updated mapping rule to each RRU.

18. The method of claim 17, further comprising receiving a request message, by the BBU, from a user equipment (UE) via a RRU of the plurality of RRUs to notify the BBU of a large amount of buffer data stored by the UE and to request additional transport blocks, wherein the request message triggers a recalculation of the mapping rule by the BBU.

* * * * *